United States Patent
Wang (10) Patent No.: US 9,678,765 B2
(45) Date of Patent: Jun. 13, 2017

(54) EXTENDING JAVA APPLICATION FUNCTIONALITY

(71) Applicant: Alibaba Group Holding Limited, Grand Cayman (KY)

(72) Inventor: Guofan Wang, Shenzhen (CN)

(73) Assignee: Alibaba Group Holding Limited, Grand Cayman (KY)

( * ) Notice: Subject to any disclaimer, the term of this patent is extended or adjusted under 35 U.S.C. 154(b) by 28 days.

(21) Appl. No.: 14/800,559

(22) Filed: Jul. 15, 2015

(65) Prior Publication Data
US 2016/0034285 A1  Feb. 4, 2016

(30) Foreign Application Priority Data

Jul. 29, 2014  (CN) .......................... 2014 1 0367052

(51) Int. Cl.
*G06F 9/44* (2006.01)
*G06F 9/45* (2006.01)
(Continued)

(52) U.S. Cl.
CPC ...... *G06F 9/44505* (2013.01); *G06F 9/44521* (2013.01); *G06F 17/30902* (2013.01);
(Continued)

(58) Field of Classification Search
CPC ............. G06F 9/44505; G06F 9/44526; G06F 9/4448; G06F 21/00; G06F 8/20;
(Continued)

(56) References Cited

U.S. PATENT DOCUMENTS 6,066,181 A  5/2000  DeMaster
6,339,829 B1  1/2002  Beadle et al.
(Continued)

OTHER PUBLICATIONS

Charlie Curtsinger et al., ZOZZLE: Fast and Precise In-Browser JavaScript Malware Detection, 2011, [Retrieved on Jan. 17, 2017]. Retrieved from the internet: <URL: https://www.usenix.org/legacy/events/sec11/tech/full_papers/Curtsinger.pdf> 16 Pages (1-16).*
(Continued)

*Primary Examiner* — Thuy Dao
*Assistant Examiner* — Anibal Rivera
(74) *Attorney, Agent, or Firm* — Lee & Hayes, PLLC (57) ABSTRACT

Methods and systems for extending functions of a JAVA application. The JAVA application may call a browser to obtain the global configuration file that is indicated by a URL and load configuration information of extensions of the JAVA application based on the global configuration file. In response to a user request received by the JAVA application, the JAVA application calls a browser and processes the user request based on the loaded configuration information of extensions of the JAVA application. In implementations, the JAVA application may transmit the user request to a server. After receiving a response to the user request from the server, the JAVA application may process the response to the user request based on the loaded configuration information of extensions of the JAVA application. The implementations may respond to the user request that is beyond the preset functions of the JAVA application.

20 Claims, 3 Drawing Sheets

(51) Int. Cl.
*G06F 9/445* (2006.01)
*G06Q 30/06* (2012.01)
*G06F 21/62* (2013.01)
*G06F 17/30* (2006.01)

(52) U.S. Cl.
CPC .......... *G06F 8/67* (2013.01); *G06F 17/30879* (2013.01); *G06F 21/6218* (2013.01); *G06Q 30/0623* (2013.01)

(58) Field of Classification Search
CPC ..... G06F 8/33; G06F 8/71; G06F 8/38; G06F 8/60; G06F 8/61; G06F 17/30442; G06F 17/30899; G06F 17/30896; G06F 17/30876; G06F 17/30902; G06F 17/30887; G06F 17/3089; G06F 17/30861; G06F 17/30893; G06F 8/67; G06F 8/41; G06F 17/30879; G06F 9/468; G06F 9/455; G06F 21/6218; G06Q 30/0623; G06Q 30/02
See application file for complete search history.

(56) References Cited

U.S. PATENT DOCUMENTS

| | | | | |
|---|---|---|---|---|
| 6,622,919 | B1* | 9/2003 | Wilz | G06F 17/30879 235/375 |
| 8,473,905 | B1 | 6/2013 | Takkallapally et al. | |
| 2002/0120666 | A1* | 8/2002 | Landsman | G06Q 30/02 709/200 |
| 2004/0031041 | A1 | 2/2004 | Windheim et al. | |
| 2004/0046014 | A1* | 3/2004 | Russell | G06F 17/30879 235/375 |
| 2004/0148354 | A1 | 7/2004 | Saare et al. | |
| 2005/0114683 | A1* | 5/2005 | Jin | G06F 21/6218 713/187 |
| 2005/0155028 | A1* | 7/2005 | Park | G06F 8/41 717/166 |
| 2006/0011716 | A1* | 1/2006 | Perkowski | G06Q 30/0623 235/375 |
| 2006/0117257 | A1* | 6/2006 | Hasson | G06F 9/4448 715/262 |
| 2006/0143200 | A1* | 6/2006 | Powlette | G06F 9/468 |
| 2006/0212361 | A1* | 9/2006 | Perkowski | G06F 17/30879 705/26.62 |
| 2007/0214123 | A1* | 9/2007 | Messer | G06F 3/0482 |
| 2008/0059975 | A1 | 3/2008 | Gioberti | |
| 2010/0057847 | A1* | 3/2010 | He | G06F 17/30902 709/203 |
| 2010/0218084 | A1* | 8/2010 | Sivadas | G06F 9/44505 715/234 |
| 2011/0214113 | A1* | 9/2011 | You | G06F 8/67 717/168 |
| 2013/0222244 | A1 | 8/2013 | Mak et al. | |
| 2014/0173088 | A1 | 6/2014 | Varney et al. | |
| 2015/0011311 | A1* | 1/2015 | Relan | A63F 13/30 463/31 |
| 2015/0074513 | A1* | 3/2015 | Liang | G06F 9/44526 715/234 |

OTHER PUBLICATIONS

Leo A. Meyerovich et al., CONSCRIPT: Specifying and Enforcing Fine-Grained Security Policies for JavaScript in the Browser, 2010 IEEE, [Retrieved on Jan. 17, 2017]. Retrieved from the internet: <URL: http://ieeexplore.ieee.org/stamp/stamp.jsp?arnumber=5504806> 16 Pages (481-496).*

PCT Search Report and Written Opinion mailed Oct. 13, 2015 for PCT Application No. PCT/US15/40638, 8 pages.

* cited by examiner

EXTENDING JAVA APPLICATION FUNCTIONALITY

CROSS REFERENCE TO RELATED PATENT APPLICATIONS

This application claims priority to Chinese Patent Application No. 201410367052.2, filed on Jul. 29, 2014, entitled "Java Application Processing Method and Apparatus," which is hereby incorporated by reference in its entirety.

TECHNICAL FIELD

Implementations herein relate to the field of computer technology, and more particularly to methods and systems for extending functions of a JAVA application.

BACKGROUND

Under control of the ANDROID operating system, JAVA applications obtain webpage data by loading a Uniform Resource Locator (URL). The JAVA applications will be implemented according to the corresponding webpage data. However, due to limited functions, the JAVA applications may not be able to fully meet user demands.

For example, when a JAVA application is loaded with a URL with respect to video resources, the JAVA application may play video files through a standard Application Program Interface (API). When a user requests to open a webpage containing multiple video files, the JAVA application cannot resolve the user request and standard API function objects are therefore called by the JAVA application. However, only one instance may be called, and multiple video files cannot be opened at the same time. Therefore, the user request is beyond the processing ability or the preset functionality of the JAVA application, and the JAVA application does not respond to the user request. When the JAVA application loads a URL including key resources, each key corresponds to a processing operation. Because of inconsistence between the keys on the webpage and the keys of a computing device (e.g., a remote control), the JAVA application may not be able to determine processing operations after receiving the key transmitted by the remote control. At the same time, the JAVA application itself cannot recognize the key transmitted by the remote control. Therefore, the user request is beyond the processing ability of the JAVA application.

In sum, the JAVA application may not be able to process user requests when the user requests demand certain functions beyond the processing ability of the JAVA application.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. Implementations herein relate to methods and systems for extending JAVA application functionalities. The implementations may solve problems when the JAVA applications cannot respond to user requests.

Implementations relate to a method for extending functions of a JAVA application. The JAVA application may obtain a global configuration file and the global configuration file may indicate configuration information. The JAVA application may load configuration information of extensions of the JAVA application. In response to a user request received by the JAVA application, the JAVA application may process the user request based on the loaded configuration information of extensions of the JAVA application. In implementations, the JAVA application may transmit the user request to a server and receives a response from the server. The JAVA application may process the response to the user request based on the loaded configuration information of extensions of the JAVA application after receiving the response to the user request. In some implementations, the JAVA application may obtain the global configuration file by calling a browser to obtain the global configuration file that is indicated by a URL. In implementations, a content of a protocol field in the URL may include a protocol identifier and a content of an address field of the URL may include storing address information of the global configuration file.

The JAVA application may call the browser to obtain the global configuration file indicated by the URL and load the configuration information of extensions of the JAVA application that is indicated by the global configuration file. The JAVA application may call the browser to obtain a protocol identifier in a protocol field of the URL. Based on the protocol identifier, the JAVA application may obtain the global configuration file from a corresponding storage location based on storing address information of the global configuration file in an address field of the URL and obtain a configuration item in the global configuration file. The configuration item may indicate a configuration information file that stores the extensions of the JAVA application. Accordingly, the JAVA application may obtain the configuration information file that stores the extensions of the JAVA application based on the configuration item and load the configuration information file to a memory of a computing device implementing the JAVA application.

In implementations, the configuration information may declare a JAVASCRIPT function object and define an instance method of JAVASCRIPT function object creation. In these instances, the declared JAVASCRIPT function object is implemented by a JAVASCRIPT statement that is interpreted and executed by the JAVA application. After receiving the response to the user request, the JAVA application may process the response to the user request based on the loaded configuration information of extensions of the JAVA application. The JAVA application may create a corresponding JAVASCRIPT function object and perform instantiation on the corresponding JAVASCRIPT function object based on the JAVASCRIPT function object creation in the response to the user request and based on a call of a JAVASCRIPT function object. The JAVASCRIPT function object is in the configuration information and corresponds to the JAVASCRIPT function object creation. The JAVA application may process the response to the user request by calling an instance of the corresponding JAVASCRIPT function object.

In implementations, based on the JAVASCRIPT function object in the JAVASCRIPT function object creation, the JAVA application may search the JAVASCRIPT function object declared by the configuration information. In response to a determination that the JAVASCRIPT function object is found, the JAVA application may call the JAVASCRIPT function object. Based on the JAVASCRIPT function object in the JAVASCRIPT function object creation, the JAVA application may search the JAVASCRIPT function object declared by the configuration information. In response to a determination that the JAVASCRIPT function object is not found, the JAVA application may call the JAVASCRIPT function object corresponding to the JAVASCRIPT function object creation using a standard API. The configuration information may include a key mapping table. Based on the loaded configuration information of extensions of the JAVA application, the JAVA application may process the user request. For example, the JAVA application obtains a first key contained in the user request, obtains a second key corresponding to the first key based on the first key and the key mapping table, replaces the first key in the user request with the second key, and responds to the second key of the user request.

In implementations, in response to a determination that the second key is not found based on the first key and the key mapping table, the JAVA application may respond to the first key of the user request. In implementations, the JAVA application runs on a TV set-top box with an operating system. In some implementations, JAVA application obtains a global configuration file in various conditions. For example, the JAVA application may obtain the global configuration file after a first startup of the JAVA application, or obtain the global configuration file after the computing device implementing the JAVA application starts. In some implementations, the JAVA application may obtain the global configuration file after each startup or initialization of the JAVA application.

In implementations, when the JAVA application is closed, a browser may release system resources occupied by the loaded configuration information. In some implementations, after receive the user request, the JAVA application may process the user request or the response by calling the browser.

Implementations herein further relate to a system for extending functions of a JAVA application. The system may include a loading module configured to obtain a global configuration file and load configuration information of extensions of the JAVA application. The configuration information is indicated by the global configuration file. The system may further include a user request processing module configured to, in response to a user request received by the JAVA application, process the user request based on the loaded configuration information of extensions of the JAVA application, or transmit the user request to a server. The user request processing module may process the response to the user request based on the loaded configuration information of extensions of the JAVA application after receiving a response to the user request from the server.

In implementations, the loading module is configured to call a browser to obtain the global configuration file that is indicated by a URL. In implementations, a content of a protocol field in the URL may include a protocol identifier and a content of an address field of the URL may include storing address information of the global configuration file. The loading module is configured to call the browser to obtain the protocol identifier in the protocol field of the URL. Based on the protocol identifier, the loading module may obtain the global configuration file from a corresponding storage location based on the storing address information of the global configuration file in the address field of the URL. The loading module may obtain a configuration item in the global configuration file. The configuration item may indicate a configuration information file that stores the extensions of the JAVA application. The loading module may obtain the configuration information file that stores the extensions of the JAVA application based on the configuration item and load the configuration information file to a memory of the system.

In implementations, the configuration information may declare a JAVASCRIPT function object and define an instance method of JAVASCRIPT function object creation, and the declared JAVASCRIPT function object is implemented by a JAVASCRIPT statement that is interpreted and executed by the JAVA application. The user request processing module is configured to create a corresponding JAVASCRIPT function object and perform instantiation on the corresponding JAVASCRIPT function object based on the JAVASCRIPT function object creation in the response to the user request and via calling a JAVASCRIPT function object in the configuration information and corresponding to the JAVASCRIPT function object creation. The user request processing module may process the response to the user request by the JAVA application calling an instance of the corresponding JAVASCRIPT function object.

In implementations, the user request processing module is configured to search the JAVASCRIPT function object declared by the configuration information based on the JAVASCRIPT function object in the JAVASCRIPT function object creation. In response to a determination that the JAVASCRIPT function object is found, the user request processing may call the JAVASCRIPT function object. The user request processing module is configured to search the JAVASCRIPT function object declared by the configuration information based on the JAVASCRIPT function object in the JAVASCRIPT function object creation. In response to a determination that the JAVASCRIPT function object is not found, the user request processing module may call the JAVASCRIPT function object corresponding to the JAVASCRIPT function object creation using a standard API.

In implementations, the configuration information may include a key mapping table. The user request processing module is configured to obtain a first key contained in the user request, obtain a second key corresponding to the first key based on the first key and the key mapping table, replace the first key in the user request with the second key, and respond to the second key of the user request.

In implementations, the user request processing module is configured to respond to the first key of the user request in response to a determination that the second key is not found based on the first key and the key mapping table. In implementations, the loading module and the user request processing module is implemented by a TV set-top box with an operating system implemented by the system.

In implementations, the JAVA application obtains a global configuration file by obtaining the global configuration file after a first startup of the JAVA application, or by obtaining the global configuration file after the computing device implementing the JAVA application starts. In implementations, the JAVA application obtains a global configuration by obtaining the global configuration file after a first startup of the JAVA application.

In implementations, the loading module is configured to release system resources occupied by the loaded configuration information when the JAVA application is closed. In implementations, the user request processing module is configured to process the user request or the response by calling the browser after receiving the user request. In some implementations, the JAVA application obtains a global configuration file and load configuration information of extensions of the JAVA application from the global configuration file. After receiving the response to the user request, the JAVA application may process the response to the user request based on the loaded configuration information of extensions of the JAVA application or may process the response to the user request.

In implementations, the JAVA application may not be able to process the user request by itself. In these instances, implementations may respond to the user request that is beyond the functions of the JAVA application. Without making changes in the structure of the JAVA application, the JAVA application may complete the operations demanded by the user request based on the loaded configuration information of extensions of the JAVA application.

BRIEF DESCRIPTION OF THE DRAWINGS

The Detailed Description is described with reference to the accompanying figures. The use of the same reference numbers in different figures indicates similar or identical items.

DETAILED DESCRIPTION

Implementations herein relate to methods and systems for extending functions of a JAVA application. Based on a global configuration file, the JAVA application loads configuration information of extensions of the JAVA application from the global configuration file. The global configuration file may be implemented in various ways. In some implementations, a URL and/or other predetermined format may indicate the configuration file. For example, a folder address directory may indicate the location of the global configuration file. Using the folder address directory, the JAVA application may load configuration information of extensions of the JAVA application from the global configuration file.

Figure 1:
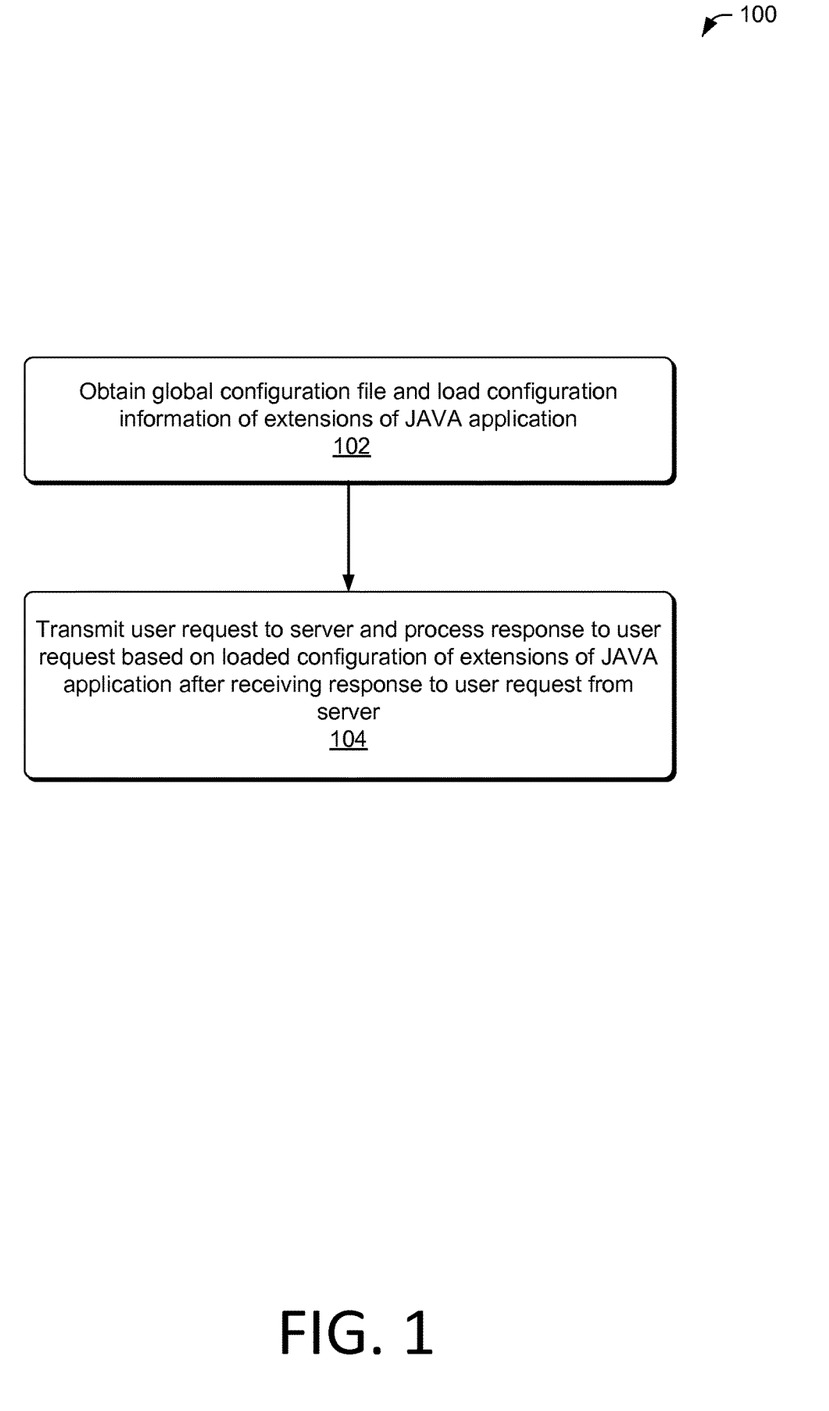
FIG. 1 is a flow chart of an illustrative process for extending functions of a JAVA application.

FIG. 1 is a flow chart of an illustrative process 100 for extending functions of a JAVA application. At 102, the JAVA application obtains a global configuration file and loads configuration information of extensions of the JAVA application. The global configuration file indicates the configuration information.

At 104, after the JAVA application receives the user request, the JAVA application may transmit the user request to a server. After receiving a response to the user request from the server, the JAVA application may process the response to the user request based on the loaded configuration information of extensions of the JAVA application.

The JAVA application may run under the control of the ANDROID operating system implemented by, for example, a mobile device and/or a TV top-set box. The JAVA application may transmit the user request to a server. The JAVA application may request that the server processes the response to the user request. After receiving a response from the server, JAVA application may process the response to the user request based on the loaded configuration information of extensions of the JAVA application. The JAVA application may load the URL via the browser. If the JAVA application has the function of loading the URL, the JAVA application may directly load the URL. The JAVA application may obtain the global configuration file after a first startup of the JAVA application and then obtain the global configuration file that is indicated by the URL. The JAVA application may store the global configuration file in a memory of the mobile device and/or the TV top-set box for future uses. The JAVA application may release the global configuration file from the memory to prevent memory leaks after the JAVA application is closed.

Figure 2:
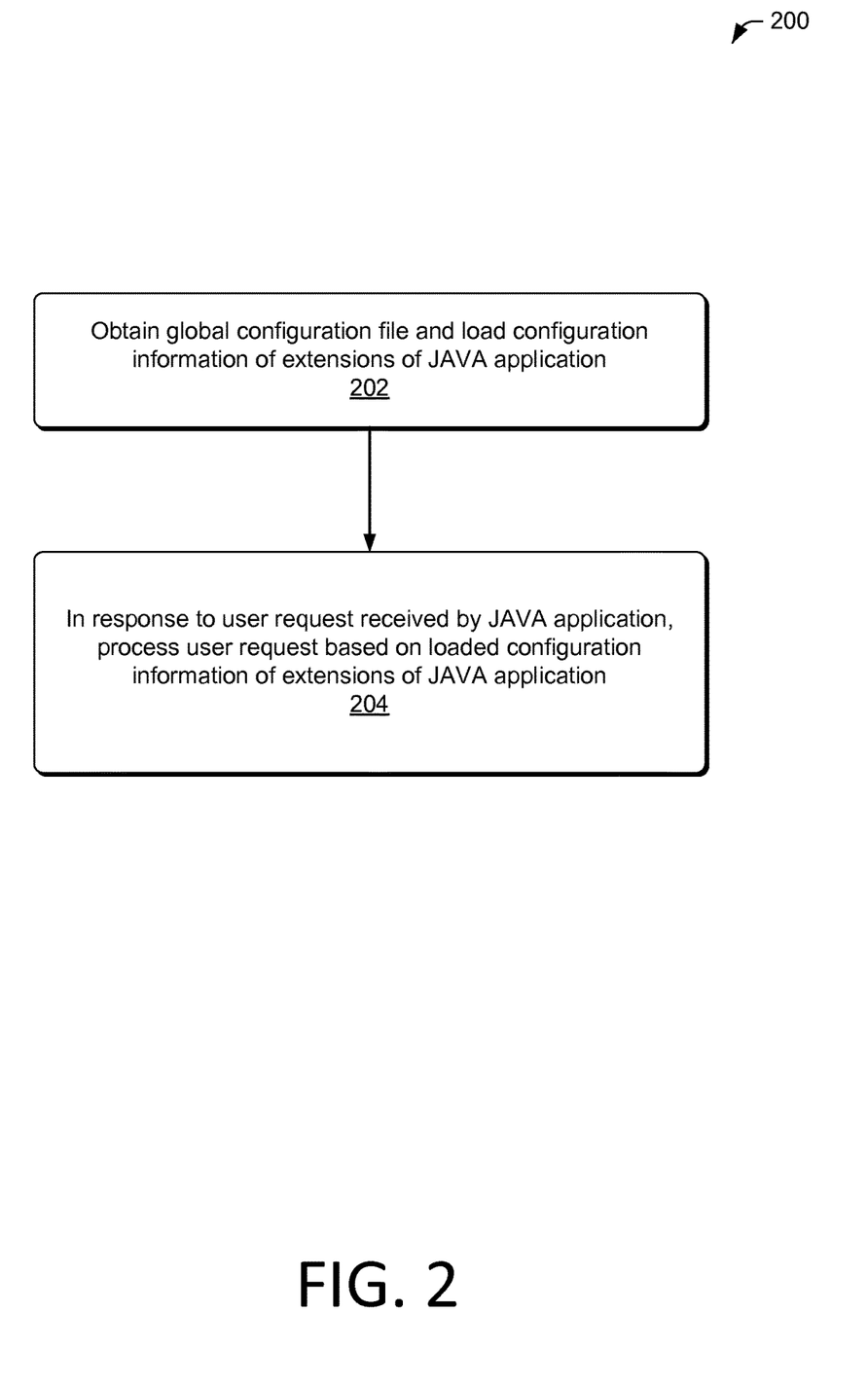
FIG. 2 is a flow chart of another illustrative process for extending functions of a JAVA application.

FIG. 2 is a flow chart of another illustrative process 200 for extending functions of a JAVA application. At 202, the JAVA application obtains a global configuration file and loads configuration information of extensions of the JAVA application. The global configuration file indicates the configuration information.

At 204, in response to a user request received by the JAVA application, the JAVA application may process the user request based on the loaded configuration information of extensions of the JAVA application.

During a startup or initialization, the JAVA application may load a global configuration file. In these instances, the JAVA application may obtain the global configuration file after a first startup of the JAVA application by calling the browser. The URL may include storing address information of the global configuration file. For example, the URL may include the location and/or a title of the global configuration file. The browser may identify the preloading function by detecting the preloaded protocol identifier in the protocol field of the URL.

For example, "preload: //" the head of the protocol may be used as a protocol identifier. The preloading identifier may include other forms. After the browser opens the URL having the preloading identifier, the JAVA application may obtain the global configuration file from a corresponding storage location based on the storing address information of the global configuration file in the address field of the URL.

The JAVA application may further read the content of the global configuration file and load configuration information of extensions of the JAVA application. The JAVA application may further load the configuration information file to a memory for future uses. The JAVA application may obtain extensions via the configuration information. One or more extensions may be declared in the configuration information. For example, the one or more extensions may include a JAVASCRIPT function object and/or a key mapping table.

In implementations, the JAVASCRIPT function object may be declared in the configuration information. The configuration information may declare a JAVASCRIPT function object and define an instance method of JAVASCRIPT function object creation. The declared JAVASCRIPT function object is implemented by a JAVASCRIPT statement that is interpreted and executed by the JAVA application.

Based on the JAVASCRIPT function object creation in the response to the user request and via calling a JAVASCRIPT function object in the configuration information and corresponding to the JAVASCRIPT function object creation, the JAVA application may create a corresponding JAVASCRIPT function object and perform instantiation on the corresponding JAVASCRIPT function object, and then the JAVA application may process the response to the user request by calling an instance of the corresponding JAVASCRIPT function object.

In implementations, the JAVASCRIPT function object may be declared in the configuration information. The configuration information may include a key mapping table. The JAVA application may obtain a first key contained in the user request, obtain a second key corresponding to the first key based on the first key and the key mapping table, replace the first key in the user request with the second key, and respond to the second key of the user request.

In implementations, the JAVASCRIPT function object may be declared in the configuration information. The configuration information may declare a JAVASCRIPT function object and define an instance method of JAVASCRIPT function object creation. The declared JAVASCRIPT function object is implemented by a JAVASCRIPT statement that is interpreted and executed by the JAVA application. Accordingly, the JAVA application may achieve corresponding functions based on the instance of the JAVASCRIPT function object in the configuration information.

If the browser opens a protocol field including a URL, such as "preload: //", the URL may be provided as follow:
preload: ///data/data/com.yunos.iptv/files/ini/browser.ini,
wherein "preload: //" is the preloading identifier in the protocol field, "/data/data/com.yunos.iptv/files/ini/" is the folder including the global configuration file, and "browser.ini" is the title of the global configuration file.

The browser may open the global configuration file in the folder and load the global configuration file. The global configuration file may include one or more configuration items.

An individual configuration item may correspond to a configuration file. The configuration file may include specific configuration information, such as the global configuration file, which may be provided as follow:
[web]
preload-js-file=itvmediaplayer.js As described above, "[web]" indicates paragraphs of the configuration file, and a configuration item "preload-js-file" indicates a storing configuration information file. The title after the configuration item indicates the title of the storing configuration information file. By loading the storing configuration file, the JAVA application may achieve the extensions configured by the configuration item. For example, "itvmediaplayer.js" may be implemented to achieve the extensions of the JAVA application.

After the global configuration file configures the configuration item, the browser may load "itvmediaplayer.js" file. The "itvmediaplayer.js" declares a JAVASCRIPT function object: "MediaPlayer". The browser may then create and/or define an instance method of a JAVASCRIPT function object creation. The declared JAVASCRIPT function object is implemented by a JAVASCRIPT statement that is interpreted and executed by the JAVA application. For example:
var MediaPlayer=function( ){
   this.instanceID=window.MediaPlayerProxy.createMediaPlayerInstance( );
}
...

In the above example, a small portion of the configuration information is provided. For example, a JAVASCRIPT function object, "MediaPlayer", is declared. After the JAVA application receives the user request, the JAVA application may transmit the user request to a server. If the user request demands a video content, the server may return a request of a JAVASCRIPT function object creation along with the video content. In these instances, a request for the JAVASCRIPT function object creation of "MediaPlayer" may be returned. After the browser receives the request, the browser may determine whether the configuration information has declared the JAVASCRIPT function object creation.

If the configuration information declares the JAVASCRIPT function object creation, the browser may call the JAVASCRIPT function object in the configuration information. The browser may further perform instantiation on the JAVASCRIPT function object to call the instance of the JAVASCRIPT function object and to process the response to the user request. The declared JAVASCRIPT function object is implemented by a JAVASCRIPT statement that is interpreted and executed by the JAVA application. The JAVA application may call one or more instances of the JAVASCRIPT function object creation multiple times.

For example, the browser may receive a request for creating "MediaPlayer" object and determine that the configuration information declares the "MediaPlayer" object. The browser may call the "MediaPlayer" object and create an instance of the "MediaPlayer" object. For example:
var mp1=new MediaPlayer( );
var mp2=new MediaPlayer( );
wherein mp1 and mp2 are two different instances of the MediaPlayer object, and mp1 and mp2 don't interfere with each other. Therefore, the browser may open multiple video files of multiple URLs.

Based on the JAVASCRIPT function object in the JAVASCRIPT function object creation, the JAVA application may search the JAVASCRIPT function object declared by the configuration information. In response to a determination that the JAVASCRIPT function object in the request of JAVASCRIPT function object creation is not found, the JAVA application may call the JAVASCRIPT function object corresponding to the JAVASCRIPT function object creation using a standard API. In some implementations, the JAVASCRIPT function object and/or the key mapping table may be declared in the configuration information. The global configuration file may configure other functions.

In implementations, the front page needs many keys while the remote control has limited keys. With new features, the remote control is difficult to make timely adjustments, resulting inconsistence between the keys on the webpage and the keys of the remote control. Then there may be no responses after a user key is transmitted. It is difficult to solve the problem by modifying the source code of the remote control. To solve the problem, implementations herein map keys on the webpage to keys on the remote control via a global configuration file.

The JAVA application may obtain a first key contained in the user request. The first key may be a key of a remote control or remote controlling device. The JAVA application, via the browser, may determine whether the configuration information of the configuration information file has a second key corresponding to the first key.

The second key corresponds to the first key based on the key mapping table. If the second key exits, the browser may replace the first key in the user request with the second key. Then, the browser may process the second key. Since functions of certain keys don't change, it is not necessary to map all the keys. If the browser does not find the second key, the browser may not change the first key. Then, the browser may process the first key. For example, the global configuration file may configure a content of the key mapping table.

For example, "browser.ini" may include:
[web]
key-mapping-file=key.xml

In the example above, "[web]" indicates paragraphs of the configuration file and includes a configuration item: "key-mapping-file", which indicates the key mapping table. The title after the key mapping table in the configuration item indicates a file specified the configured function in the configuration item. By loading the file, the JAVA application may achieve the key mapping function configured by the configuration item. In this instance, the file is "key.xml". "key.xml" is titles of multiple configuration files, which are evenly stored in folders of applications. "key.xml" may include:
<?xml version="1.0" encoding="ISO-8859-1"?>
<KeyMapping>
<Key PlatformKey="remote control key 1" WebKey="mapped value 1"/>
<Key PlatformKey="remote control key 2" WebKey="mapped value 2"/>
</KeyMapping>

The first line indicates that the file is a XML file, and the second line indicates that "KeyMapping" is labeled as for key mapping. The third and fourth lines include contents starting using "key" to indicate the specific mapping relationship. "PlatformKey" represents the first key; "WebKey" represents the second key. For another example, "key.xml" may include as follow:
<?xml version="1.0" encoding="ISO-8859-1"?>
<KeyMapping>
<Key PlatformKey="1085" WebKey="263"/>
<Key PlatformKey="1090" WebKey="264"/>
</KeyMapping>

The description above include a mapping relationship between two keys. "<Key PlatformKey="1085" WebKey="263"/>" represent that the first key is 1085 and the mapped value is 263. "<Key PlatformKey="1090" WebKey="264"/>" represents that the first key is 1090 and the mapped value is 264. When a user sends a user request, such as the request to "pause playback", "pause playback" on the remote control key corresponds to 1085. Only when the browser receives the keys: 263, the browser will perform "Pause Playback" function. However, the remote control keys don't include 263, the browser may not respond to the user request without the mapping operation.

The JAVA application receives a user request including a key: 1085. The browser may first determine whether the key mapping table includes the mapping key. If the browser determine that 263 is mapped to the key: 1085. The browser may call the function corresponding to 263.

As another example, when a user sends a request containing the key: 1010, the browser does not find any key corresponding to 1010. The browser may call the function corresponding to 1010.

Figure 3:
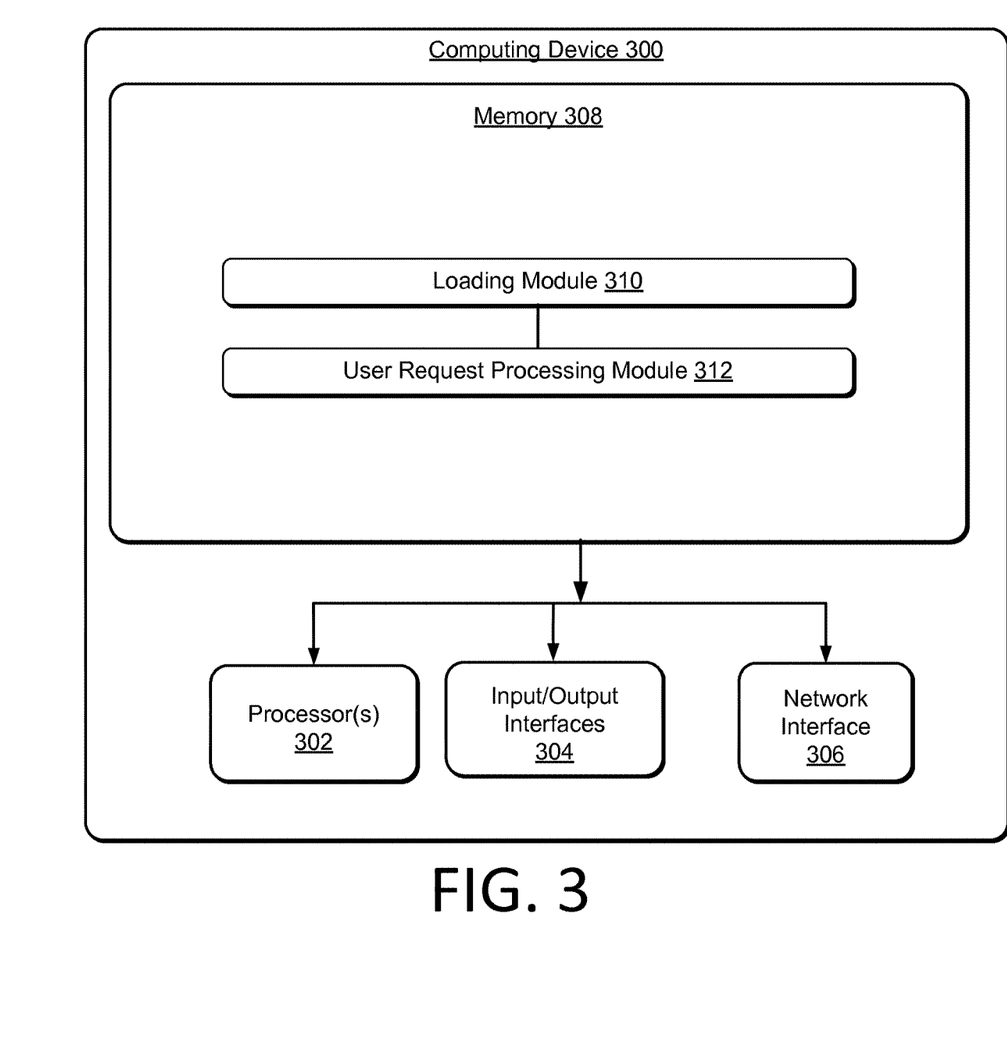
FIG. 3 is schematic diagram of illustrative computing architecture that enables extending functions of a JAVA application.

FIG. 3 is schematic diagrams of illustrative computing device 300 that enables extending functions of a JAVA application. The computing device 300 may be a user device or a server for extending functions of a JAVA application. In an exemplary configuration, the computing device 300 includes one or more processors 302, input/output interfaces 304, network interface 306, and memory 308.

The memory 308 may include computer-readable media in the form of volatile memory, such as random-access memory (RAM) and/or non-volatile memory, such as read only memory (ROM) or flash RAM. The memory 508 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 308 in more detail, the memory 308 may include a loading module 310 and a user request processing module 312. The loading module 310 is configured to obtain a global configuration file and to load configuration information of extensions of the JAVA application. In these instances, the configuration information is indicated by the global configuration file. The user request processing module 312 is configured to, in response to a user request received by the JAVA application, execute the various operations. For example, the user request processing module 312 may process the user request based on the loaded configuration information of extensions of the JAVA application, or transmit the user request to a server after receiving a response to the user request. The JAVA application may process the response to the user request based on the loaded configuration information of extensions of the JAVA application.

The loading module 310 is further configured to call a browser to obtain the global configuration file that is indicated by a URL. In implementations, a content of a protocol field in the URL may include a protocol identifier, and a content of an address field of the URL may include storing address information of the global configuration file. In these instances, the loading module 310 is further configured to call the browser to obtain the protocol identifier in the protocol field of the URL and to execute the following various operations based on the protocol identifier.

The loading module 310 may obtain the global configuration file from a corresponding storage location based on the storing address information of the global configuration file in the address field of the URL. The loading module 310 may further obtain a configuration item in the global configuration file. The configuration item may indicate a configuration information file that stores the extensions of the JAVA application. The loading module 310 may obtain the configuration information file that stores the extensions of the JAVA application based on the configuration item and load the configuration information file to a memory. In implementations, the configuration information may declare a JAVASCRIPT function object and define an instance method of JAVASCRIPT function object creation. The declared JAVASCRIPT function object is implemented by a JAVASCRIPT statement that is interpreted and executed by the JAVA application.

The user request processing module 312 is further configured to create a corresponding JAVASCRIPT function object and perform instantiation on the corresponding JAVASCRIPT function object based on the JAVASCRIPT function object creation in the response to the user request and via calling a JAVASCRIPT function object in the configuration information and corresponding to the JAVASCRIPT function object creation. The user request processing module 312 may process the response to the user request by calling an instance of the corresponding JAVASCRIPT function object using the JAVA application.

In implementations, the user request processing module 312 is further configured to search the JAVASCRIPT function object declared by the configuration information based on the JAVASCRIPT function object in the JAVASCRIPT function object creation. In response to a determination that the JAVASCRIPT function object is found, the user request processing module 312 may call the JAVASCRIPT function object. The user request processing module 312 may search the JAVASCRIPT function object declared by the configuration information based on the JAVASCRIPT function object in the JAVASCRIPT function object creation. In response to a determination that the JAVASCRIPT function object is not found, the user request processing module 312 may call the JAVASCRIPT function object corresponding to the JAVASCRIPT function object creation using a standard API.

In implementations, the configuration information may include a key mapping table. In these instances, the user request processing module 312 is further configured to obtain a first key contained in the user request, obtain a second key corresponding to the first key based on the first key and the key mapping table, replace the first key in the user request with the second key, and respond to the second key of the user request. The user request processing module 312 is further configured to respond to the first key of the user request in response to a determination that the second key is not found based on the first key and the key mapping table.

In implementations, the loading module 310 and the user request processing module 312 may be implemented by a TV set-top box with an operating system. In implementations, the JAVA application obtains a global configuration file by obtaining the global configuration file after a first startup of the JAVA application, or obtaining the global configuration file after the computing device implementing the JAVA application starts. In implementations, the JAVA application obtains a global configuration file by obtaining the global configuration file after a first startup of the JAVA application. The loading module 310 is further configured to release system resources occupied by the loaded configuration information when the JAVA application is closed. The user request processing module 312 is further configured to process the user request or the response by calling the browser in response to a user request received by the JAVA application.

Implementations herein allow a JAVA application to load a global configuration file in a URL having a preloading identifier. The global configuration file configures at least an extension to process the URL page data. After receiving the response to the user request, the JAVA application may process the response to the user request based on the loaded configuration information of extensions of the JAVA application that are beyond processing ability of the JAVA application itself.

The embodiments are merely for illustrating the present disclosure and are not intended to limit the scope of the present disclosure. It should be understood for persons in the technical field that certain modifications and improvements may be made and should be considered under the protection of the present disclosure without departing from the principles of the present disclosure.

What is claimed is:

1. A method implemented by a computing device, the method comprising:
   obtaining a global configuration file that indicates configuration information of extensions of a JAVA application,
   loading the configuration information based on the global configuration file; and
   in response to receiving a user request:
      processing the user request based on the loaded configuration information of the extensions of the JAVA application, or
      transmitting the user request to a server, receiving a response to the user request from the server, and processing the response to the user request based on the loaded configuration information of the extensions of the JAVA application, processing the response to the user request including:
         searching for a respective JAVASCRIPT function object from among one or more JAVASCRIPT function objects declared in the configuration information based on a JAVASCRIPT function object requested to be created in a JAVASCRIPT function object creation in the response to the user request;
         calling the respective JAVASCRIPT function object if the respective JAVASCRIPT function object is found in the configuration information; and
         calling the respective JAVASCRIPT function object corresponding to the JAVASCRIPT function object creation using a standard application program interface (API) if the respective JAVASCRIPT function object is not found in the configuration information.

2. The method of claim 1, wherein the obtaining the global configuration file comprises calling a browser to obtain the global configuration file that is indicated by a uniform resource locator (URL).

3. The method of claim 1, wherein a content of a protocol field in a URL comprises a protocol identifier, a contents of an address field of the URL comprises storing address information of the global configuration file, and the method further comprises:
   calling a browser to obtain the protocol identifier in the protocol field of the URL; and
   based on the protocol identifier:
      obtaining the global configuration file from a corresponding storage location based on the storing address information of the global configuration file in the address field of the URL,
      obtaining a configuration item in the global configuration file, the configuration item indicating a configuration information file that stores the extensions of the JAVA application,
      obtaining the configuration information file that stores the extensions of the JAVA application based on the configuration item, and
      loading the configuration information file to a memory associated with the computing device.

4. The method of claim 1, wherein the configuration information declares one or more JAVASCRIPT function objects and defines instance methods of respective one or more JAVASCRIPT function object creations, the one or more declared JAVASCRIPT function objects are implemented by one or more JAVASCRIPT statements that are interpretable and executable by the JAVA application, and wherein processing the response to the user request further comprises:
   creating and instantiating the respective JAVASCRIPT function object that corresponds to the JAVASCRIPT function object creation in the response to the user request by calling the respective JAVASCRIPT function object in the configuration information in accordance with the JAVASCRIPT function object creation in the response to the user request; and
   calling an instance of the respective JAVASCRIPT function object to process the response to the user request.

5. The method of claim 1, wherein the configuration information comprises a key mapping table, the processing the user request based on the loaded configuration information of extensions of the JAVA application comprises:
obtaining a first key in the user request,
obtaining a second key corresponding to the first key based on the first key and the key mapping table,
replacing the first key in the user request with the second key, and
responding to the second key of the user request.

6. The method of claim 5, further comprising:
responding to the first key of the user request in response to a determination that the second key is not found based on the first key and the key mapping table.

7. The method of claim 1, wherein the JAVA application runs on a TV set-top box with an operating system.

8. The method of claim 1, wherein the obtaining the global configuration file comprises:
obtaining the global configuration file after a first startup of the JAVA application; or
obtaining the global configuration file after the computing device implementing the JAVA application starts.

9. The method of claim 1, wherein the obtaining the global configuration file comprises obtaining the global configuration file in response to each call of the JAVA application.

10. The method of claim 9, further comprising:
releasing system resources occupied by the loaded configuration information after the JAVA application is closed.

11. The method of claim 1, further comprising:
processing the user request or the response by calling a browser after the JAVA application receives the user request.

12. A system for comprising:
one or more processors; and
memory to maintain a plurality of components executable by the one or more processors, the plurality of components comprising:
a loading module configured to:
obtain a global configuration file that indicates configuration information of extensions of a JAVA application, and
load the configuration information of the extensions of the JAVA application based on the global configuration file, and
a user request processing module configured to:
in response to receiving a user request:
process the user request based on the loaded configuration information of the extensions of the JAVA application, or
transmit the user request to a server, receive a response to the user request from the server, and process the response to the user request based on the loaded configuration information of extensions of the JAVA application, processing the response to the user request including:
searching for a respective JAVASCRIPT function object from among one or more JAVASCRIPT function objects declared in the configuration information based on a JAVASCRIPT function object requested to be created in a JAVASCRIPT function object creation in the response to the user request;
calling the respective JAVASCRIPT function object if the respective JAVASCRIPT function object is found in the configuration information; and
calling the respective JAVASCRIPT function object corresponding to the JAVASCRIPT function object creation using a standard application program interface (API) if the respective JAVASCRIPT function object is not found in the configuration information.

13. The system of claim 12, wherein the loading module is further configured to call a browser to obtain the global configuration file that is indicated by a uniform resource locator (URL).

14. The system of claim 13, wherein a content of a protocol field in the URL comprises a protocol identifier, a content of an address field of the URL comprises storing address information of the global configuration file, and wherein the loading module is further configured to:
call the browser to obtain the protocol identifier in the protocol field of the URL, and based on the protocol identifier:
obtain the global configuration file from a corresponding storage location based on the storing address information of the global configuration file in the address field of the URL,
obtain a configuration item in the global configuration file, the configuration item indicating a configuration information file that stores the extensions of the JAVA application,
obtain the configuration information file that stores the extensions of the JAVA application based on the configuration item, and
load the configuration information file to the memory.

15. The system of claim 12, wherein the configuration information declares one or more JAVASCRIPT function objects and defines instance methods of respective one or more JAVASCRIPT function object creations, the one or more declared JAVASCRIPT function objects are implemented by one or more JAVASCRIPT statements that are interpretable and executable by the JAVA application, and wherein the user request processing module is further configured to:
create and instantiate the respective JAVASCRIPT function object that corresponds to the JAVASCRIPT function object creation in the response to the user request by calling the respective JAVASCRIPT function object in the configuration information in accordance with the JAVASCRIPT function object creation in the response to the user request, and
call an instance of the respective JAVASCRIPT function object to process the response to the user request.

16. The system of claim 12, wherein the configuration information comprises a key mapping table, and wherein the user request processing module is further configured to:
obtain a first key contained in the user request,
obtain a second key corresponding to the first key based on the first key and the key mapping table,
replace the first key in the user request with the second key, and
respond to the second key of the user request.

17. The system of claim 16, wherein the user request processing module is further configured to respond to the first key of the user request in response to a determination that the second key is not found based on the first key and the key mapping table.

18. The system of claim 12, wherein the loading module and the user request processing module are implemented by a TV set-top box with an operating system.

19. One or more computer-readable media storing executable instructions that, when executed by one or more processors, cause the one or more processors to perform acts comprising:
- obtaining a global configuration file that indicates configuration information of extensions of a JAVA application;
- loading the configuration information based on the global configuration file; and
- transmitting the user request to a server, receiving a response to the user request from the server, and processing the response to the user request based on the loaded configuration information of the extensions of the JAVA application, in response to receiving a user request, processing the response to the user request including:
  - searching for a respective JAVASCRIPT function object from among one or more JAVASCRIPT function objects declared in the configuration information based on a JAVASCRIPT function object requested to be created in a JAVASCRIPT function object creation in the response to the user request;
  - calling the respective JAVASCRIPT function object if the respective JAVASCRIPT function object is found in the configuration information; and
  - calling the respective JAVASCRIPT function object corresponding to the JAVASCRIPT function object creation using a standard application program interface (API) if the respective JAVASCRIPT function object is not found in the configuration information.

20. The one or more computer-readable media of claim 19, wherein the configuration information declares one or more JAVASCRIPT function objects and defines instance methods of respective one or more JAVASCRIPT function object creations, the one or more declared JAVASCRIPT function objects are implemented by one or more JAVASCRIPT statements that are interpretable and executable by the JAVA application, and wherein processing the response to the user request further comprises:
- creating and instantiating the respective JAVASCRIPT function object that corresponds to the JAVASCRIPT function object creation in the response to the user request by calling the JAVASCRIPT function object in the configuration information in accordance with the JAVASCRIPT function object creation in the response to the user request; and
- calling an instance of the respective JAVASCRIPT function object to process the response to the user request.

* * * * *